(12) United States Patent
Jobs et al.

(10) Patent No.: US 9,274,991 B2
(45) Date of Patent: *Mar. 1, 2016

(54) MEMORY HUB ARCHITECTURE HAVING PROGRAMMABLE LANE WIDTHS

(71) Applicant: Micron Technology, Inc., Boise, ID (US)

(72) Inventors: Jeffrey R. Jobs, Blaine, MN (US); Thomas A. Stenglein, Andover, MN (US)

(73) Assignee: Micron Technology, Inc., Boise, ID (US)

( * ) Notice: Subject to any disclaimer, the term of this patent is extended or adjusted under 35 U.S.C. 154(b) by 112 days.

This patent is subject to a terminal disclaimer.

(21) Appl. No.: 14/300,903

(22) Filed: Jun. 10, 2014

(65) Prior Publication Data
US 2014/0297974 A1    Oct. 2, 2014

Related U.S. Application Data

(63) Continuation of application No. 13/208,198, filed on Aug. 11, 2011, now Pat. No. 8,775,764, which is a continuation of application No. 12/550,989, filed on Aug. 31, 2009, now Pat. No. 8,015,384, which is a (Continued)

(51) Int. Cl.
*G06F 13/00* (2006.01)
*G06F 13/40* (2006.01)
*G06F 13/16* (2006.01)

(52) U.S. Cl.
CPC ........ *G06F 13/4018* (2013.01); *G06F 13/1678* (2013.01); *G06F 13/1684* (2013.01)

(58) Field of Classification Search
CPC ............ G06F 13/1648; G06F 13/1684; G06F 13/4018

USPC ............................ 711/170; 710/27, 307, 300
See application file for complete search history.

(56) References Cited

U.S. PATENT DOCUMENTS 3,777,154  A    12/1973  Lindsey
4,045,781  A    8/1977   Levy et al.

(Continued)

FOREIGN PATENT DOCUMENTS

EP    000343988 A2 *  11/1989  .............. G06F 12/08
EP    0849685 A2      6/1998

(Continued)

OTHER PUBLICATIONS

"Free On-Line Dictionary of Computing", http://foldoc.doc.ic.ac.uk/foldoc/foldoc/cgi?flash+memory, Flash Erasable Programmable Read-Only Memory, May 17, 2004, 1 page.

(Continued)

*Primary Examiner* — Pierre-Michel Bataille
(74) *Attorney, Agent, or Firm* — Dorsey & Whitney LLP

(57) ABSTRACT

A processor-based system includes a processor coupled to a system controller through a processor bus. The system controller is used to couple at least one input device, at least one output device, and at least one data storage device to the processor. Also coupled to the processor bus is a memory hub controller coupled to a memory hub of at least one memory module having a plurality of memory devices coupled to the memory hub. The memory hub is coupled to the memory hub controller through a downstream bus and an upstream bus. The downstream bus has a width of M bits, and the upstream bus has a width of N bits. Although the sum of M and N is fixed, the individual values of M and N can be adjusted during the operation of the processor-based system to adjust the bandwidths of the downstream bus and the upstream bus.

27 Claims, 2 Drawing Sheets

Related U.S. Application Data continuation of application No. 12/074,888, filed on Mar. 7, 2008, now Pat. No. 7,596,675, which is a continuation of application No. 10/979,727, filed on Nov. 1, 2004, now Pat. No. 7,159,706.

(56) References Cited

U.S. PATENT DOCUMENTS

| | | |
|---|---|---|
| 4,240,143 A | 12/1980 | Besemer et al. |
| 4,245,306 A | 1/1981 | Besemer et al. |
| 4,253,144 A | 2/1981 | Bellamy et al. |
| 4,253,146 A | 2/1981 | Bellamy et al. |
| 4,443,845 A | 4/1984 | Hamilton et al. |
| 4,608,702 A | 8/1986 | Hirzel et al. |
| 4,633,437 A | 12/1986 | Mothersole |
| 4,707,823 A | 11/1987 | Holdren et al. |
| 4,724,520 A | 2/1988 | Athanas et al. |
| 4,809,232 A | 2/1989 | Baumbaugh et al. |
| 4,813,772 A | 3/1989 | Kowel et al. |
| 4,823,403 A | 4/1989 | Twietmeyer |
| 4,825,208 A | 4/1989 | Mueller et al. |
| 4,891,808 A | 1/1990 | Williams |
| 4,930,128 A | 5/1990 | Suzuki et al. |
| 4,953,930 A | 9/1990 | Ramsey et al. |
| 5,241,506 A | 8/1993 | Motegi et al. |
| 5,243,703 A | 9/1993 | Farmwald et al. |
| 5,251,303 A | 10/1993 | Fogg, Jr. et al. |
| 5,269,022 A | 12/1993 | Shinjo et al. |
| 5,307,381 A | 4/1994 | Ahuja |
| 5,317,752 A | 5/1994 | Jewett et al. |
| 5,319,755 A | 6/1994 | Farmwald et al. |
| 5,327,553 A | 7/1994 | Jewett et al. |
| 5,355,391 A | 10/1994 | Horowitz et al. |
| 5,379,382 A | 1/1995 | Work et al. |
| 5,394,528 A | 2/1995 | Kobayashi et al. |
| 5,414,819 A | 5/1995 | Redmond et al. |
| 5,423,009 A | 6/1995 | Zhu |
| 5,432,823 A | 7/1995 | Gasbarro et al. |
| 5,432,907 A | 7/1995 | Picazo, Jr. et al. |
| 5,442,770 A | 8/1995 | Barratt |
| 5,461,627 A | 10/1995 | Rypinski |
| 5,465,229 A | 11/1995 | Bechtolsheim et al. |
| 5,479,370 A | 12/1995 | Furuyama et al. |
| 5,493,437 A | 2/1996 | Lebby et al. |
| 5,497,476 A | 3/1996 | Oldfield et al. |
| 5,502,621 A | 3/1996 | Schumacher et al. |
| 5,532,856 A | 7/1996 | Li et al. |
| 5,544,319 A | 8/1996 | Acton et al. |
| 5,544,345 A | 8/1996 | Carpenter et al. |
| 5,566,325 A | 10/1996 | Bruce, II et al. |
| 5,568,574 A | 10/1996 | Tanguay, Jr. et al. |
| 5,577,220 A | 11/1996 | Combs et al. |
| 5,581,767 A | 12/1996 | Katsuki et al. |
| 5,606,717 A | 2/1997 | Farmwald et al. |
| 5,608,264 A | 3/1997 | Gaul |
| 5,613,078 A | 3/1997 | Kishigami |
| 5,623,534 A | 4/1997 | Desai et al. |
| 5,638,334 A | 6/1997 | Farmwald et al. |
| 5,659,798 A | 8/1997 | Blumrich et al. |
| 5,706,224 A | 1/1998 | Srinivasan et al. |
| 5,715,456 A | 2/1998 | Bennett et al. |
| 5,729,709 A | 3/1998 | Harness |
| 5,748,616 A | 5/1998 | Riley |
| 5,787,475 A | 7/1998 | Pawlowski |
| 5,808,897 A | 9/1998 | Miller, Jr. et al. |
| 5,818,844 A | 10/1998 | Singh et al. |
| 5,818,984 A | 10/1998 | Ahmad et al. |
| 5,819,304 A | 10/1998 | Nilsen et al. |
| 5,822,255 A | 10/1998 | Uchida |
| 5,831,467 A | 11/1998 | Leung et al. |
| 5,832,250 A | 11/1998 | Whittaker |
| 5,872,944 A | 2/1999 | Goldrian et al. |
| 5,875,352 A | 2/1999 | Gentry et al. |
| 5,875,454 A | 2/1999 | Craft et al. |
| 5,928,343 A | 7/1999 | Farmwald et al. |
| 5,935,428 A | 8/1999 | Yamamoto et al. |
| 5,966,724 A | 10/1999 | Ryan |
| 5,968,146 A | 10/1999 | Tanaka et al. |
| 5,973,935 A | 10/1999 | Schoenfeld et al. |
| 5,973,951 A | 10/1999 | Bechtolsheim et al. |
| 5,978,567 A | 11/1999 | Rebane et al. |
| 5,987,196 A | 11/1999 | Noble |
| 6,023,726 A | 2/2000 | Saksena |
| 6,026,098 A | 2/2000 | Kamoi et al. |
| 6,026,226 A | 2/2000 | Heile et al. |
| 6,029,250 A | 2/2000 | Keeth |
| 6,031,241 A | 2/2000 | Silfvast et al. |
| 6,033,951 A | 3/2000 | Chao |
| 6,061,263 A | 5/2000 | Boaz et al. |
| 6,061,296 A | 5/2000 | Ternullo, Jr. et al. |
| 6,067,262 A | 5/2000 | Irrinki et al. |
| 6,073,190 A | 6/2000 | Rooney |
| 6,076,139 A | 6/2000 | Welker et al. |
| 6,078,451 A | 6/2000 | Ioki |
| 6,079,008 A | 6/2000 | Clery, III |
| 6,084,688 A | 7/2000 | Stumbo et al. |
| 6,088,774 A | 7/2000 | Gillingham |
| 6,098,158 A | 8/2000 | Lay et al. |
| 6,101,151 A | 8/2000 | Watanabe et al. |
| 6,105,075 A | 8/2000 | Ghaffari |
| 6,105,088 A | 8/2000 | Pascale et al. |
| 6,111,757 A | 8/2000 | Dell et al. |
| 6,125,431 A | 9/2000 | Kobayashi |
| 6,131,149 A | 10/2000 | Lu et al. |
| 6,134,624 A | 10/2000 | Burns et al. |
| 6,137,709 A | 10/2000 | Boaz et al. |
| 6,144,327 A | 11/2000 | Distinti et al. |
| 6,144,587 A | 11/2000 | Yoshida |
| 6,167,465 A | 12/2000 | Parvin et al. |
| 6,167,486 A | 12/2000 | Lee et al. |
| 6,175,571 B1 | 1/2001 | Haddock et al. |
| 6,185,352 B1 | 2/2001 | Hurley |
| 6,186,400 B1 | 2/2001 | Dvorkis et al. |
| 6,191,663 B1 | 2/2001 | Hannah |
| 6,201,724 B1 | 3/2001 | Ishizaki et al. |
| 6,208,180 B1 | 3/2001 | Fisch et al. |
| 6,219,725 B1 | 4/2001 | Diehl et al. |
| 6,226,729 B1 | 5/2001 | Stevens et al. |
| 6,229,712 B1 | 5/2001 | Munoz-Bustamante et al. |
| 6,229,727 B1 | 5/2001 | Doyle |
| 6,233,376 B1 | 5/2001 | Updegrove |
| 6,243,769 B1 | 6/2001 | Rooney |
| 6,243,831 B1 | 6/2001 | Mustafa et al. |
| 6,246,618 B1 | 6/2001 | Yamamoto et al. |
| 6,247,107 B1 | 6/2001 | Christie |
| 6,249,802 B1 | 6/2001 | Richardson et al. |
| 6,256,253 B1 | 7/2001 | Oberlaender et al. |
| 6,256,692 B1 | 7/2001 | Yoda et al. |
| 6,266,730 B1 | 7/2001 | Perino et al. |
| 6,272,609 B1 | 8/2001 | Jeddeloh |
| 6,285,349 B1 | 9/2001 | Smith |
| 6,286,083 B1 | 9/2001 | Chin et al. |
| 6,294,937 B1 | 9/2001 | Crafts et al. |
| 6,301,637 B1 | 10/2001 | Krull et al. |
| 6,327,642 B1 | 12/2001 | Lee et al. |
| 6,330,205 B2 | 12/2001 | Shimizu et al. |
| 6,343,171 B1 | 1/2002 | Yoshimura et al. |
| 6,344,664 B1 | 2/2002 | Trezza et al. |
| 6,347,055 B1 | 2/2002 | Motomura |
| 6,349,363 B2 | 2/2002 | Cai et al. |
| 6,356,573 B1 | 3/2002 | Jonsson et al. |
| 6,366,375 B1 | 4/2002 | Sakai et al. |
| 6,366,529 B1 | 4/2002 | Williams et al. |
| 6,367,074 B1 | 4/2002 | Bates et al. |
| 6,370,068 B2 | 4/2002 | Rhee |
| 6,373,777 B1 | 4/2002 | Suzuki |
| 6,381,190 B1 | 4/2002 | Shinkai |
| 6,392,653 B1 | 5/2002 | Malandain et al. |
| 6,401,213 B1 | 6/2002 | Jeddeloh |
| 6,405,273 B1 | 6/2002 | Fleck et al. |
| 6,405,280 B1 | 6/2002 | Ryan |
| 6,421,744 B1 | 7/2002 | Morrison et al. |
| 6,430,626 B1 | 8/2002 | Keeth |
| 6,434,639 B1 | 8/2002 | Haghighi |

(56) References Cited

U.S. PATENT DOCUMENTS

| | | |
|---|---|---|
| 6,434,654 B1 | 8/2002 | Story et al. |
| 6,434,696 B1 | 8/2002 | Kang |
| 6,434,736 B1 | 8/2002 | Schaecher et al. |
| 6,438,622 B1 | 8/2002 | Haghighi et al. |
| 6,438,668 B1 | 8/2002 | Esfahani et al. |
| 6,449,308 B1 | 9/2002 | Knight, Jr. et al. |
| 6,453,377 B1 | 9/2002 | Farnworth et al. |
| 6,453,393 B1 | 9/2002 | Holman et al. |
| 6,457,116 B1 | 9/2002 | Mirsky et al. |
| 6,462,978 B2 | 10/2002 | Shibata et al. |
| 6,463,059 B1 | 10/2002 | Movshovich et al. |
| 6,470,422 B2 | 10/2002 | Cai et al. |
| 6,473,828 B1 | 10/2002 | Matsui |
| 6,477,592 B1 | 11/2002 | Chen et al. |
| 6,477,614 B1 | 11/2002 | Leddige et al. |
| 6,477,621 B1 | 11/2002 | Lee et al. |
| 6,479,322 B2 | 11/2002 | Kawata et al. |
| 6,490,188 B2 | 12/2002 | Nuxoll et al. |
| 6,493,784 B1 | 12/2002 | Kamimura et al. |
| 6,493,803 B1 | 12/2002 | Pham et al. |
| 6,496,909 B1 | 12/2002 | Schimmel |
| 6,501,471 B1 | 12/2002 | Venkataraman et al. |
| 6,502,161 B1 | 12/2002 | Perego et al. |
| 6,505,287 B2 | 1/2003 | Uematsu |
| 6,507,899 B1 | 1/2003 | Oberlaender et al. |
| 6,523,092 B1 | 2/2003 | Fanning |
| 6,523,093 B1 | 2/2003 | Bogin et al. |
| 6,526,498 B1 | 2/2003 | Mirsky et al. |
| 6,539,490 B1 | 3/2003 | Forbes et al. |
| 6,552,304 B1 | 4/2003 | Hirose et al. |
| 6,552,564 B1 | 4/2003 | Forbes et al. |
| 6,553,479 B2 | 4/2003 | Mirsky et al. |
| 6,564,329 B1 | 5/2003 | Cheung et al. |
| 6,567,963 B1 | 5/2003 | Trezza |
| 6,570,429 B1 | 5/2003 | Hellriegel |
| 6,584,543 B2 | 6/2003 | Williams et al. |
| 6,587,912 B2 | 7/2003 | Leddige et al. |
| 6,590,816 B2 | 7/2003 | Perner |
| 6,594,713 B1 | 7/2003 | Fuoco et al. |
| 6,594,722 B1 | 7/2003 | Willke, II et al. |
| 6,598,154 B1 | 7/2003 | Vaid et al. |
| 6,599,031 B2 | 7/2003 | Li |
| 6,615,325 B2 | 9/2003 | Mailloux et al. |
| 6,618,777 B1 | 9/2003 | Greenfield |
| 6,622,227 B2 | 9/2003 | Zumkehr et al. |
| 6,623,177 B1 | 9/2003 | Chilton |
| 6,628,294 B1 | 9/2003 | Sadowsky et al. |
| 6,629,220 B1 | 9/2003 | Dyer |
| 6,631,440 B2 | 10/2003 | Jenne et al. |
| 6,636,110 B1 | 10/2003 | Ooishi et al. |
| 6,636,957 B2 | 10/2003 | Stevens et al. |
| 6,643,787 B1 | 11/2003 | Zerbe et al. |
| 6,646,929 B1 | 11/2003 | Moss et al. |
| 6,651,139 B1 | 11/2003 | Ozeki et al. |
| 6,658,509 B1 | 12/2003 | Bonella et al. |
| 6,661,940 B2 | 12/2003 | Kim |
| 6,661,943 B2 | 12/2003 | Li |
| 6,662,304 B2 | 12/2003 | Keeth et al. |
| 6,665,202 B2 | 12/2003 | Lindahl et al. |
| 6,667,895 B2 | 12/2003 | Jang et al. |
| 6,681,292 B2 | 1/2004 | Creta et al. |
| 6,681,301 B1 | 1/2004 | Mehta et al. |
| 6,681,341 B1 | 1/2004 | Fredenburg et al. |
| 6,697,926 B2 | 2/2004 | Johnson et al. |
| 6,707,726 B2 | 3/2004 | Nishio et al. |
| 6,711,652 B2 | 3/2004 | Arimilli et al. |
| 6,715,018 B2 | 3/2004 | Farnworth et al. |
| 6,718,440 B2 | 4/2004 | Maiyuran et al. |
| 6,721,187 B2 | 4/2004 | Hall et al. |
| 6,721,195 B2 | 4/2004 | Brunelle et al. |
| 6,724,685 B2 | 4/2004 | Braun et al. |
| 6,728,800 B1 | 4/2004 | Lee et al. |
| 6,735,679 B1 | 5/2004 | Herbst et al. |
| 6,735,682 B2 | 5/2004 | Segelken et al. |
| 6,745,275 B2 | 6/2004 | Chang |
| 6,751,113 B2 | 6/2004 | Bhakta et al. |
| 6,751,703 B2 | 6/2004 | Chilton |
| 6,751,722 B2 | 6/2004 | Mirsky et al. |
| 6,752,539 B2 | 6/2004 | Colgan et al. |
| 6,754,117 B2 | 6/2004 | Jeddeloh |
| 6,754,812 B1 | 6/2004 | Abdallah et al. |
| 6,756,661 B2 | 6/2004 | Tsuneda et al. |
| 6,760,833 B1 | 7/2004 | Dowling |
| 6,771,538 B2 | 8/2004 | Shukuri et al. |
| 6,772,261 B1 | 8/2004 | D'Antonio et al. |
| 6,775,747 B2 | 8/2004 | Venkatraman |
| 6,789,173 B1 | 9/2004 | Tanaka et al. |
| 6,792,059 B2 | 9/2004 | Yuan et al. |
| 6,792,496 B2 | 9/2004 | Aboulenein et al. |
| 6,793,408 B2 | 9/2004 | Levy et al. |
| 6,793,411 B2 | 9/2004 | Seifert |
| 6,795,899 B2 | 9/2004 | Dodd et al. |
| 6,799,246 B1 | 9/2004 | Wise et al. |
| 6,799,268 B1 | 9/2004 | Boggs et al. |
| 6,804,760 B2 | 10/2004 | Wiliams |
| 6,804,764 B2 | 10/2004 | Laberge et al. |
| 6,807,630 B2 | 10/2004 | Lay et al. |
| 6,811,320 B1 | 11/2004 | Abbott |
| 6,816,931 B2 | 11/2004 | Shih |
| 6,816,947 B1 | 11/2004 | Huffman |
| 6,820,181 B2 | 11/2004 | Jeddeloh et al. |
| 6,821,029 B1 | 11/2004 | Grung et al. |
| 6,823,023 B1 | 11/2004 | Hannah |
| 6,826,160 B1 | 11/2004 | Wang et al. |
| 6,829,398 B2 | 12/2004 | Ouchi |
| 6,845,409 B1 | 1/2005 | Talagala et al. |
| 6,889,304 B2 | 5/2005 | Perego et al. |
| 6,910,109 B2 | 6/2005 | Holman et al. |
| 6,910,812 B2 | 6/2005 | Pommer et al. |
| 6,949,406 B2 | 9/2005 | Bosnyak et al. |
| 6,950,956 B2 | 9/2005 | Zerbe et al. |
| 6,956,996 B2 | 10/2005 | Gordon et al. |
| 6,961,259 B2 | 11/2005 | Lee et al. |
| 6,961,834 B2 | 11/2005 | Weber |
| 6,980,042 B2 | 12/2005 | LaBerge |
| 6,980,748 B2 | 12/2005 | Leas |
| 6,982,892 B2 | 1/2006 | Lee et al. |
| 7,000,062 B2 | 2/2006 | Perego et al. |
| 7,016,213 B2 | 3/2006 | Reeves et al. |
| 7,016,606 B2 | 3/2006 | Cai et al. |
| 7,024,547 B2 | 4/2006 | Kartoz |
| 7,035,212 B1 | 4/2006 | Mittal et al. |
| 7,047,351 B2 | 5/2006 | Jeddeloh |
| 7,062,595 B2 | 6/2006 | Lindsay et al. |
| 7,085,087 B2 | 8/2006 | Fukuhisa et al. |
| 7,102,907 B2 | 9/2006 | Lee et al. |
| 7,106,611 B2 | 9/2006 | Lee et al. |
| 7,106,973 B2 | 9/2006 | Kube et al. |
| 7,120,723 B2 | 10/2006 | Jeddeloh |
| 7,120,727 B2 | 10/2006 | Lee et al. |
| 7,120,743 B2 | 10/2006 | Meyer et al. |
| 7,136,953 B1 | 11/2006 | Bisson et al. |
| 7,171,508 B2 | 1/2007 | Choi |
| 7,174,409 B2 | 2/2007 | Jeddeloh |
| 7,181,584 B2 | 2/2007 | LaBerge |
| 7,200,024 B2 | 4/2007 | Taylor |
| 7,206,887 B2 | 4/2007 | Jeddeloh |
| 7,213,082 B2 | 5/2007 | Jeddeloh |
| 7,216,196 B2 | 5/2007 | Jeddeloh |
| 7,222,210 B2 | 5/2007 | Jeddeloh |
| 7,222,213 B2 | 5/2007 | James |
| 7,234,070 B2 | 6/2007 | James |
| 7,242,213 B2 | 7/2007 | Pax et al. |
| 7,245,145 B2 | 7/2007 | Pax et al. |
| 7,254,331 B2 | 8/2007 | Murphy |
| 7,257,683 B2 | 8/2007 | Jeddeloh et al. |
| 7,266,633 B2 | 9/2007 | James |
| 7,282,947 B2 | 10/2007 | Pax et al. |
| 7,289,347 B2 | 10/2007 | Taylor |
| 7,330,992 B2 | 2/2008 | Jeddeloh et al. |
| 7,392,331 B2 | 6/2008 | James et al. |
| 7,412,571 B2 | 8/2008 | Jeddeloh et al. |
| 7,426,597 B1 | 9/2008 | Tsu |
| 7,447,824 B2 | 11/2008 | Jabori et al. |

(56) References Cited

U.S. PATENT DOCUMENTS

| | | |
|---|---|---|
| 7,584,336 B2 | 9/2009 | Tremaine |
| 7,793,030 B2 | 9/2010 | Jenkins et al. |
| 7,805,586 B2 | 9/2010 | Ryan |
| 7,827,348 B2 | 11/2010 | Lee et al. |
| 7,870,329 B2 | 1/2011 | Janzen |
| 8,346,998 B2 | 1/2013 | James |
| 2001/0023474 A1 | 9/2001 | Kyozuka et al. |
| 2001/0034839 A1 | 10/2001 | Karjoth et al. |
| 2001/0039612 A1 | 11/2001 | Lee |
| 2001/0039632 A1 | 11/2001 | Maclaren et al. |
| 2002/0038412 A1 | 3/2002 | Nizar et al. |
| 2002/0112119 A1 | 8/2002 | Halbert et al. |
| 2002/0116588 A1 | 8/2002 | Beckert et al. |
| 2002/0144064 A1 | 10/2002 | Fanning |
| 2003/0005223 A1 | 1/2003 | Coulson et al. |
| 2003/0043158 A1 | 3/2003 | Wasserman et al. |
| 2003/0043426 A1 | 3/2003 | Baker et al. |
| 2003/0093630 A1 | 5/2003 | Richard et al. |
| 2003/0149809 A1 | 8/2003 | Jensen et al. |
| 2003/0163649 A1 | 8/2003 | Kapur et al. |
| 2003/0177320 A1 | 9/2003 | Sah et al. |
| 2003/0193927 A1 | 10/2003 | Hronik |
| 2003/0217223 A1 | 11/2003 | Nino, Jr. et al. |
| 2003/0227798 A1 | 12/2003 | Pax |
| 2003/0229734 A1 | 12/2003 | Chang et al. |
| 2003/0229770 A1 | 12/2003 | Jeddeloh |
| 2004/0015650 A1 | 1/2004 | Zumkehr et al. |
| 2004/0022094 A1 | 2/2004 | Radhakrishnan et al. |
| 2004/0024959 A1 | 2/2004 | Taylor |
| 2004/0028412 A1 | 2/2004 | Murphy |
| 2004/0037133 A1* | 2/2004 | Park et al. ............ 365/202 |
| 2004/0044833 A1 | 3/2004 | Ryan |
| 2004/0044857 A1 | 3/2004 | Jeddeloh |
| 2004/0047169 A1 | 3/2004 | Lee et al. |
| 2004/0064595 A1* | 4/2004 | Tanaka et al. ............ 710/1 |
| 2004/0123088 A1 | 6/2004 | Poisner et al. |
| 2004/0126115 A1 | 7/2004 | Levy et al. |
| 2004/0128421 A1 | 7/2004 | Forbes |
| 2004/0144994 A1 | 7/2004 | Lee et al. |
| 2004/0148482 A1 | 7/2004 | Grundy et al. |
| 2004/0230718 A1 | 11/2004 | Polzin et al. |
| 2004/0236885 A1 | 11/2004 | Fredriksson et al. |
| 2004/0251929 A1 | 12/2004 | Pax et al. |
| 2004/0257890 A1 | 12/2004 | Lee et al. |
| 2004/0268009 A1 | 12/2004 | Shin et al. |
| 2005/0030797 A1 | 2/2005 | Pax et al. |
| 2005/0044304 A1 | 2/2005 | James |
| 2005/0044327 A1 | 2/2005 | Howard et al. |
| 2005/0071542 A1 | 3/2005 | Weber et al. |
| 2005/0091464 A1 | 4/2005 | James |
| 2005/0105350 A1 | 5/2005 | Zimmerman |
| 2005/0162882 A1 | 7/2005 | Reeves et al. |
| 2005/0177690 A1 | 8/2005 | Laberge |
| 2005/0210185 A1 | 9/2005 | Renick |
| 2005/0210216 A1 | 9/2005 | Jobs et al. |
| 2005/0216648 A1 | 9/2005 | Jeddeloh |
| 2005/0257021 A1 | 11/2005 | James |
| 2005/0268060 A1 | 12/2005 | Cronin et al. |
| 2006/0023528 A1 | 2/2006 | Pax et al. |
| 2006/0023633 A1 | 2/2006 | Caruk |
| 2006/0047891 A1 | 3/2006 | James et al. |
| 2006/0179208 A1 | 8/2006 | Jeddeloh |
| 2006/0195647 A1 | 8/2006 | Jeddeloh |
| 2007/0067541 A1 | 3/2007 | Chang |
| 2011/0103122 A1 | 5/2011 | Janzen |
| 2011/0191517 A1 | 8/2011 | James |

FOREIGN PATENT DOCUMENTS

| | | |
|---|---|---|
| GB | 2288066 A | 10/1995 |
| JP | 2001-265539 A | 9/2001 |
| WO | 93/19422 | 9/1993 |
| WO | 02/27499 A2 | 4/2002 |

OTHER PUBLICATIONS

"Webster's New World Computer Dictionary", Wiley Publishing, Inc., copyright 2003.

EP Office Action dated Aug. 2, 2011 for EP Application No. 05724531.8.

Gillingham, Peter "SLDRAM Architectural and Functional Overview", 1997 SLDRAM Consortium, 1-14.

Intel, "Flash Memory PCI Add-In Card for Embedded Systems", Application Note AP-758, Sep. 1997, 1-13.

Intel "Intel 840 Chipset: 82840 Memory Controller Hub (MCH) Datasheet", www.intel.com/design/chipsets/datashts/298020.htm, Oct. 1999, 1-178.

Micron Technology, Inc, , "Synchronous DRAM Module 512 MB/1GB (x72, ECC) 168-Pin Registered FBGA SDRAM DIMM", Micron Technology, Inc, 2002, 1-23.

Scott, et al., "An Overview of the Visualize fx Graphics Hardware", May 1998, 29.

Shanley, T "PCI System Architecture", 3rd Edition, Mindshare Inc, 1995, 24-25.

Tanenbaum, "Structured Computer Organization", 3rd Edition, 1990, 11-13.

Clugston, Mike , "Definition of "cache"", www.xreferplus.com, 2004.

Depari, A. et al., "USB Sensor Network for Industrial Applications", IEEE Xplore, Abstract Only, May 2004.

Gillett, R. et al., "Using the Memory Channel Network", Micro IEEE, vol. 17, Issue 1, Abstract Only, Feb. 1997.

Gommans, et al., "Applications Drive Secure Lightpath Creation Across Heterogeneous Domains", Communications Magazine, IEEE, +—vol. 44, Issue 3, Abstract Only, Mar. 2006.

Hsieh, et al., "On the Design of a Local Switch for Heterogeneous Multi-subsystem Interconnected", IEEE Xplore, Abstract Only, Oct. 1993.

Omkar, et al., "Neural Network Controller for Minimizing Hub Shear Forces in Helicopter", IEEE Xplore, Abstract Only, Sep. 1998.

Scott, Noel D. et al., "An Overview of the Visualize fx Graphics Accelerator Hardware", The Hewlett-Packard Journal, Article 4, May 1998, 28-34.

* cited by examiner

MEMORY HUB ARCHITECTURE HAVING PROGRAMMABLE LANE WIDTHS

CROSS REFERENCE TO RELATED APPLICATIONS

This application is a continuation of U.S. patent application Ser. No. 13/208,198, filed Aug. 11, 2011 and issued as U.S. Pat. No. 8,775,764 on Jul. 8, 2014, which is a continuation of U.S. patent application Ser. No. 12/550,989, filed Aug. 31, 2009, and issued as U.S. Pat. No. 8,015,384 on Sep. 6, 2011, which is a continuation of U.S. patent application Ser. No. 12/074,888, filed Mar. 7, 2008 and issued as U.S. Pat. No. 7,596,675 on Sep. 29, 2009, which is a continuation of U.S. patent application Ser. No. 10/797,727, filed Mar. 8, 2004, and issued as U.S. Pat. No. 7,366,864 on Apr. 29, 2008. These applications and patents are each incorporated herein by reference, in their entirety, for any purpose.

TECHNICAL FIELD

This invention relates to processor-based systems having system memory, and, more particularly, to processor-based systems having memory modules containing a memory hub in which the memory hubs are coupled to the processor through a memory hub controller through a downstream bus and an upstream bus.

BACKGROUND OF THE INVENTION

Processor-based systems, such as computer systems, use memory devices, such as dynamic random access memory ("DRAM") devices, as system memory to store instructions and data that are accessed by a processor. In a typical computer system, the processor communicates with the system memory through a processor bus and a memory controller. The processor issues a memory request, which includes a memory command, such as a read command, and an address designating the location from which data or instructions are to be read or to which data or instructions are to be written. The memory controller uses the command and address to generate appropriate command signals as well as row and column addresses, which are applied to the system memory. In response to the commands and addresses, data is transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase speed at which memory commands, addresses and data can be coupled between processors and memory devices. The relatively slow speed of memory controllers and memory devices limits the data bandwidth between the processor and the memory devices.

One approach to increasing the data bandwidth to and from memory devices is to use multiple memory devices coupled to the processor through a memory hub as shown in FIG. 1. A computer system 100 using a memory hub architecture includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, is typically static random access memory ("SRAM"). Finally, the processor bus 106 is coupled to a system controller 110, which is also sometimes referred to as a bus bridge.

The system controller 110 contains a memory hub controller 128 that is coupled to the processor 104. The memory hub controller 128 is also coupled to several memory modules 130a-n through a bus system 134. Each of the memory modules 130a-n includes a memory hub 140 coupled to several memory devices 148 through command, address and data buses, collectively shown as bus 150. The memory hub 140 efficiently routes memory requests and responses between the controller 128 and the memory devices 148. Computer systems employing this architecture can have a higher bandwidth because the processor 104 can access one memory module 130a-n while another memory module 130a-n is responding to a prior memory access. For example, the processor 104 can output write data to one of the memory modules 130a-n in the system while another memory module 130a-n in the system is preparing to provide read data to the processor 104. The operating efficiency of computer systems using a memory hub architecture can make it more practical to vastly increase data bandwidth of a memory system. A memory hub architecture can also provide greatly increased memory capacity in computer systems.

The system controller 110 also serves as a communications path to the processor 104 for a variety of other components. More specifically, the system controller 110 includes a graphics port that is typically coupled to a graphics controller 112 which is in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

A memory hub architecture can greatly increase the rate at which data can be stored in and retrieved from memory because the point-to-point nature of the bus system 134 allows faster electrical signaling, and because the isolated nature of the DRAMs allows parallel or overlapping activity in several modules. In fact, a memory system using several memory modules each containing a memory hub can collectively transmit and receive data at such a high rate that the bus system 134 can become the "bottleneck" limiting the data bandwidth of the memory system.

One technique that has been used to maximize the data bandwidth of memory systems using a memory hub architecture is to implement the bus system 134 using a high-speed "downstream" bus 154 and an "upstream" bus 156 that is separate from the downstream bus 154. The downstream bus 154 and the upstream bus have the same width, i.e., number of conductors. The high-speed downstream bus 154 couples packets containing a memory command, an address, and write data from the memory hub controller 128 to the memory modules 130 and from the memory modules 130 to memory modules 130 located further away from the memory hub controller 128. The high-speed upstream bus 156 couples a packet containing read data and an identifier from memory modules 130 to the memory hub controller 128 and from the memory modules 130 to memory modules 130 located closer to the memory hub controller 128. The use of two different uni-directional buses has the advantage of eliminating turn around latency and allowing the memory hub controller to simultaneously transmit and receive data.

The data bandwidth of memory systems using a memory hub architecture can also be maximized by using a different type of memory signaling protocol. Rather than using traditional address, data and control buses, the address, data and control bits for each memory request or "transaction" are sent together in a single packet. The packet includes a command header followed by read or write data. The command header includes bits corresponding to a memory command, such as a write or a read command, identifying bits that specify the memory module to which the request is directed, and address bits that specify the address of the memory devices 148 in the specified memory module that is being accessed with the request. The command header may also specify the quantity of read or write data that follows the command header. The use of a packetized memory system allows the memory hub controller 128 to issue a memory request by simply transmitting a packet instead of transmitting a sequence of command, address and, in the case of a write request, write data signals. As a result, the memory hub controller 128 can issue memory requests at a faster rate. Furthermore, a packetized memory system frees the memory hub controller 128 from having to keep track of the processing details of each memory request. Instead, the memory hub controller 128 need only transmit the packet. The memory hub 140 in the memory module 130 to which the memory request is directed then processes the memory request without further interaction with the memory hub controller 128. In the case of a read request, the memory hub 140 transmits a packet back to the memory hub controller 128, either directly or through intervening memory modules 130, that contains the read data as well as identifying bits in a command header identifying the read data. The memory hub controller 128 uses the identifying bits to associate the read data with a specific memory request.

Although the memory hub architecture shown in FIG. 1 can provide a significant increase in the data bandwidth between the processor 104 and the memory devices 148, it nevertheless can provide at less than optimum performance. In particular, the capacity of either the downstream bus 154 or the upstream bus 156 can limit the rate at which packets can be coupled to or from the memory modules 130, thereby limiting data bandwidth. The particular bus 154, 156 that becomes overloaded normally depends on the nature of the memory accesses. Memory writes result in a significantly greater amount of traffic through the downstream bus 154 compared to the traffic through the upstream bus 156. Memory reads still require that packets containing commands and addresses be coupled through the downstream bus 154, but they generally result in significantly more traffic being routed through the upstream bus 156. Therefore, memory accesses primarily consisting of writes tend to overload the downstream bus 154, and memory accesses consisting, primarily of reads tend to overload the upstream bus 156. In either case, the result is a reduced data bandwidth between the processor 104 and the memory devices 148.

There is therefore a need for a memory hub architecture that is more able to avoid overloading either the downstream bus or the upstream bus coupled between a memory hub controller and one or more memory hubs.

SUMMARY OF THE INVENTION

A memory system that may be used in a processor-based system includes a memory hub controller coupled to at least one memory module having a memory hub and a plurality of memory devices coupled to the memory hub. Command, address and data signals are coupled from the memory hub controller to the memory hub using a communications path having a first capacity, and data signals are coupled from the memory hub to the memory hub controller using a communications path having a second capacity. Although the sum of the first capacity and the second capacity is a fixed value, the individual values of the first and second capacities are altered during the operation of the memory system, such as while the memory system is being initialized, depending upon the magnitudes of the actual or anticipated signal flow through the communication path. In the event of an increase in the magnitude of the actual or anticipated signal flow from the memory huh controller to the memory hub, the first capacity can be increased and the second capacity can be decreased. In the event of an increase in the magnitude of the actual or anticipated signal flow from the memory hub to the memory hub controller, the second capacity can be increased and the first capacity can be decreased.

DETAILED DESCRIPTION OF THE INVENTION

Figure 1:
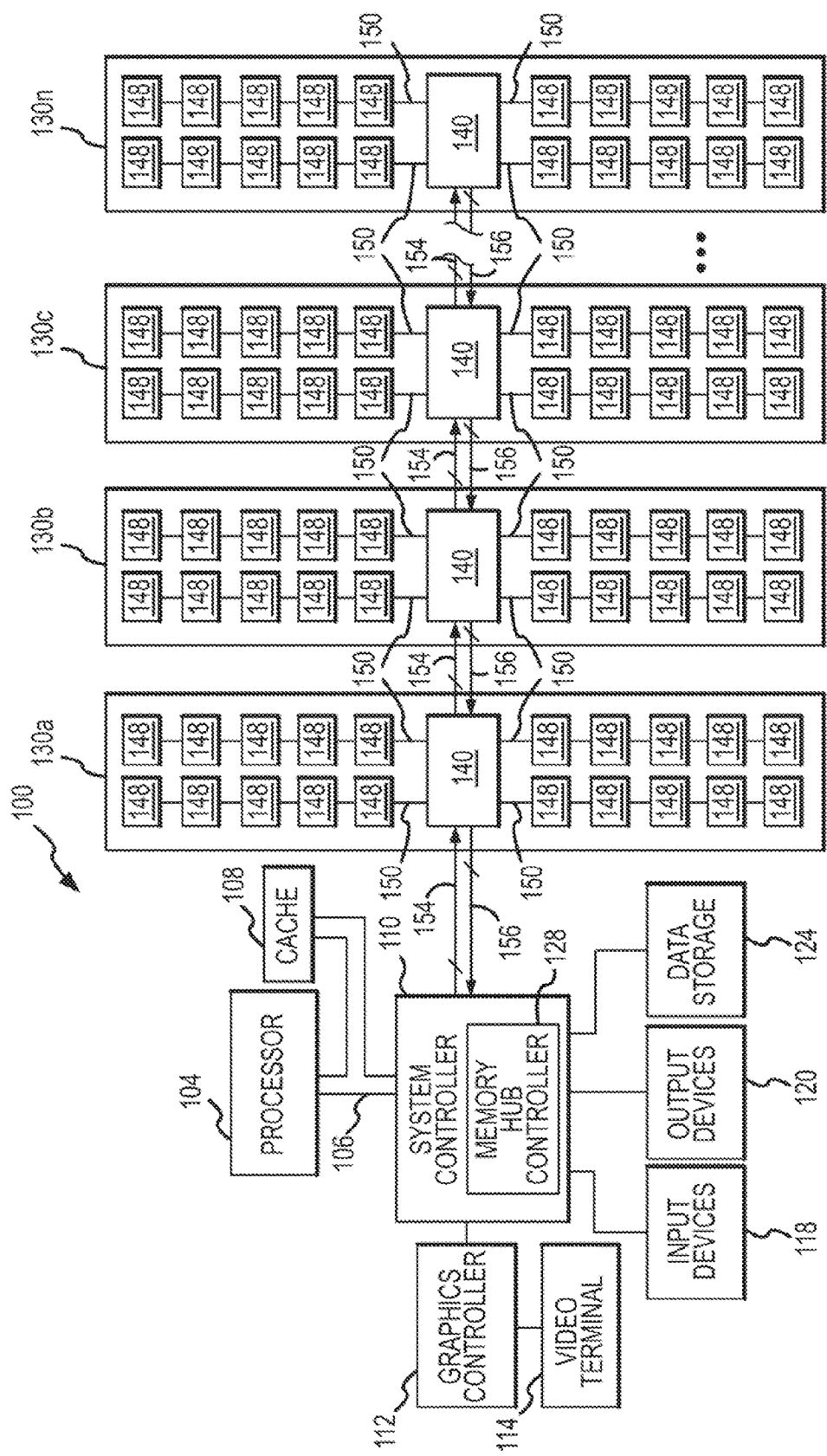
FIG. 1 is a block diagram of a processor-based system having system memory that uses a conventional memory hub architecture.
Figure 2:
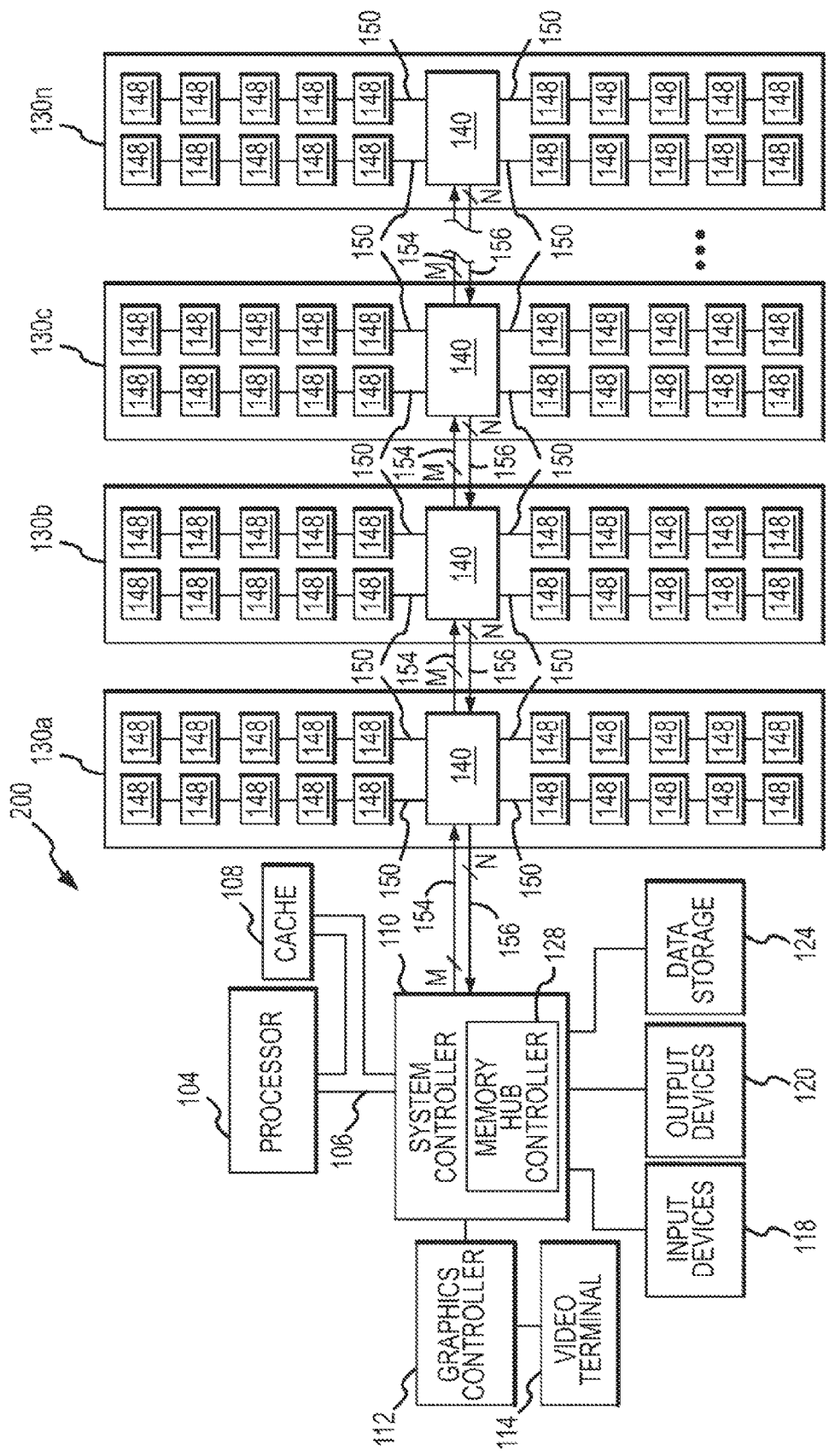
FIG. 2 is a block diagram of a processor-based system having system memory using a memory huh architecture according to one embodiment of the invention.

A processor-based system 200 according to one embodiment of the invention is shown in FIG. 2. The system 200 uses most of the same components used in the system 100 of FIG. 1, and they operate in the same manner. Therefore, in the interest of brevity, they have been provided with the same reference number, and an explanation of their operation will not be repeated. The processor-based system 200 differs from the system 100 shown in FIG. 1 in that the widths of the downstream bus 154 and upstream bus 156 are not fixed, nor are they necessarily equal to each other. Instead, the downstream bus 154 has a width of M bits, and the upstream bus 156 has a width of N bits, where the sum of M and N is equal to a fixed value. The values of M and N are dynamic, preferably depending on the nature of the actual or expected memory accesses. If a disproportionately large number of writes are occurring or expected to occur, the value of M is increased to increase the capacity of the downstream bus 154, and the value of N is decreased accordingly to decrease the capacity of the upstream bus 156. If a disproportionately large number of reads are occurring or expected to occur, the value of M is decreased to decrease the capacity of the downstream bus 154, and the value of N is increased accordingly to increase the capacity of the upstream bus 156.

The capacity M of the downstream bus 154 relative to the capacity N of the upstream bus 156 can be determined using a variety of techniques. The system 200 can be manually configured in a semi-permanent manner by manually manipulating hardware jumpers or the like to select the values of M and N. In such case, the values of M and N may be determined during system design based on the anticipated usage of the system 200. However, rather than being static, the values of M and N are preferably dynamic, i.e., they change during the operation of the system 200. The values of M and N may be dynamically changed based on either the actual traffic flow through the buses 154, 156, or the anticipated traffic flow through the buses 154, 156. Alternatively, the values of M and N may be changed at other times during the operation of the memory system, such as when the memory system is being initialized.

If the actual traffic flow is used as the basis for adjusting M and N, the traffic through the buses 154, 156 may be determined by the memory hub controller 128 and the memory hubs 140, which can then adjust M and N by configuring internal buffers coupled to the signals lines in the buses 154, 156 as either input buffers or Output butlers. Alternatively, the traffic through the buses 154, 156 may be determined by only the memory hub controller 128, which can couple configuration data to the memory hubs 140. In such case, default values for M and N are used to couple the configuration to the memory hubs 140. The memory hubs 140 can then use the configuration data to configure internal buffers coupled to the signals lines in the buses 154, 156 as either input buffers or output buffers. As an alternative to using hardware to analyze the traffic flow through the buses 154, 156 the actual traffic flow could be determined by software, such as the operation system or run time agents. Other means of determining the actual traffic flow through the buses 154, 156 can also be used.

If anticipated traffic flow through the buses 154, 156 is used as the basis for adjusting M and N, the anticipated traffic flow may be determined by a user and then coupled to the memory hub controller 128 and the memory hubs 140 by suitable means. For example, the anticipated usage information can be coupled through a suitable interface, such as a JTAG interface (not shown) or and I2C interface (not shown). In either case, the memory hub controller 128 and the memory hubs 140 can then configure internal buffers coupled to the signals lines in the buses 154, 156 accordingly.

The anticipated traffic flow through the buses 154, 156 may be either determined directly by a user, as explained above, or it may be inferred from other information. The anticipated traffic flow the buses 154, 156 may be determined based on either the type of hardware included in the system 200 or the software being executed by the processor 104. For example, the processor 104 may determine the appropriate values of M and N and couple these values to the memory hub controller 128 and the memory hubs 140 based on the type of application program executed by the processor 104. There are normally a large number of write accesses when an installation program is being executed. In such case, the processor 104 would increase the value of M and decrease the value of N. A graphics intensive application program, on the other hand, normally requires a disproportionate number of read accesses, so the value of M would be decreased and the value of N would be increased. A communications program normally has about an equal number of reads and writes, so the value of M would be set equal to the value of N. Other hardware or software means for determining the expected traffic flow through the buses 154, 156 can alternatively be used.

Although all of the signal lines in the buses 154, 156 may be configurable as bi-directional so that they can be either part of the downstream bus 154 or part of the upstream bus 156, some of the lines in the buses 154, 156 corresponding in number to minimum values of M and N may be uni-directional and thus dedicated to either the downstream bus 154 or the upstream bus 156. The requirement that the input of an input buffer be coupled to each line that is also coupled to the output of an output buffer may have a tendency in some cases to overload the line. However, this potential problem can be alleviated by equalization techniques or by decoupling the input buffers from the lines of the buses 154, 156 when they are not in use, for example. The manner in which input and output buffers should be coupled to the buses 154, 156, as well as the specific hardware and software than can be used to determine the values of M and N, will be readily apparent to one skilled in the art.

From the foregoing it will be appreciated that, although specific embodiments of the invention have been described herein for purposes of illustration, it will be understood by one skilled in the art that various modifications may be made without deviating from the spirit and scope of the invention. For example, although the memory modules are shown as being physically separate from the memory hub controller, it will be understood that they need not be physically separate. Instead, the memory hub controller and the memory modules may be mounted on a common substrate, such as a motherboard. Accordingly, the invention is not limited except as by the appended claims.

What is claimed is:

1. An apparatus comprising:
   a plurality of memory devices;
   logic coupled to the plurality of memory devices and configured to route memory requests to, and responses from, the plurality of memory devices;
   an upstream bus coupled to the logic and having a width of M bits; and
   a downstream bus coupled to the logic and having a width of N bits,
   wherein the sum of M and N is fixed and values of M and N are adjustable.

2. The apparatus of claim 1, wherein the logic comprises a memory hub.

3. The apparatus of claim 1, further comprising a processor coupled to the logic through the upstream and downstream buses.

4. The apparatus of claim 3, wherein the processor is coupled to the logic through a system controller.

5. The apparatus of claim 4, wherein the system controller includes a memory hub controller.

6. The apparatus of claim 1, wherein the plurality of memory devices and the logic are included in a memory module.

7. The apparatus of claim 1, wherein the plurality of memory devices comprises a first plurality of memory devices, the logic comprises first logic, the upstream bus comprises a first upstream bus and the downstream bus comprises a first downstream bus, the apparatus further comprising:
   a second plurality of memory devices;
   second logic coupled to the second plurality of memory devices and configured to route memory requests to, and responses from, the second plurality of memory devices;
   a second upstream bus coupled between the first logic and the second logic; and
   a second downstream bus coupled between the first logic and the second logic.

8. The apparatus of claim 1 wherein the values of M and N are adjustable during operation of the apparatus.

9. The apparatus of claim 1, wherein the logic is coupled to the plurality of memory devices through command, address and data buses.

10. The apparatus of claim 1, wherein each of the buses is configured to carry packets that include a header and data.

11. The apparatus of claim 10, wherein the logic is configured to process a received memory request without interaction with an external controller.

12. The apparatus of claim 1, wherein the values of M and N are adjustable while the apparatus is being initialized.

13. The apparatus of claim 1, wherein the values of M and N depend on a magnitude of actual signal flow to the logic.

14. The apparatus of claim 1, wherein the values of M and N depend on a magnitude of expected signal flow to the logic.

15. The apparatus of claim 1, wherein the values of M and N depend on a nature of actual memory accesses.

16. The apparatus of claim 1, wherein the values of M and N depend on a nature of expected memory accesses.

17. The apparatus of claim 1, wherein the values of M and N dynamically change based on actual traffic flow through the buses.

18. The apparatus of claim 17, wherein the logic is configured to determine the actual traffic flow through the buses.

19. The apparatus of claim 1, wherein the logic is configured to adjust the values of M and N responsive to receiving configuration data.

20. The apparatus of claim 1, wherein the logic is configured to adjust M and N by configuring buffers coupled to the buses as either input buffers or output buffers.

21. The apparatus of claim 1, wherein the values of M and N dynamically change based on anticipated traffic flow through the buses.

22. The apparatus of claim 21, wherein the anticipated traffic flow is determined by a user of the apparatus.

23. The apparatus of claim 1, wherein the values of M and N are based on a type of application program being executed by a processor coupled to the logic through the buses.

24. The apparatus of claim 1, wherein the buses include bi-directional signal lines.

25. The apparatus of claim 1, wherein the buses include some unidirectional signal lines.

26. An apparatus comprising:
a plurality of memory devices;
logic coupled to the plurality of memory devices and configured to route memory requests to, and responses from, the plurality of memory devices;
an upstream bus coupled to the logic and having a width of M bits; and
a downstream bus coupled to the logic and having a width of N bits,
wherein the sum of M and N is fixed, values of M and N are adjustable, and wherein the values of M and N depend on a nature of expected memory accesses.

27. An apparatus comprising:
a plurality of memory devices;
logic coupled to the plurality of memory devices and configured to route memory requests to, and responses from, the plurality of memory devices;
an upstream bus coupled to the logic and having a width of M bits; and
a downstream bus coupled to the logic and having a width of N bits,
wherein the sum of M and N is fixed, values of M and N are adjustable, and wherein the values of M and N dynamically change based on actual traffic flow through the buses.

\* \* \* \* \*